(12) United States Patent
Rosenbloom et al.

(10) Patent No.: US 7,389,516 B2
(45) Date of Patent: Jun. 17, 2008

(54) SYSTEM AND METHOD FOR FACILITATING INTERACTION BETWEEN A COMPUTER AND A NETWORK SCANNER

(75) Inventors: Oren Rosenbloom, Redmond, WA (US); Keisuke Tsuchida, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 647 days.

(21) Appl. No.: 10/464,920

(22) Filed: Jun. 19, 2003

(65) Prior Publication Data
US 2004/0261084 A1    Dec. 23, 2004

(51) Int. Cl.
*G06F 3/00*     (2006.01)
*G06F 15/177*   (2006.01)

(52) U.S. Cl. ..................... 719/321; 709/220

(58) Field of Classification Search ............. 719/321, 719/322, 310; 709/220
See application file for complete search history.

(56) References Cited

U.S. PATENT DOCUMENTS

| | | | |
|---|---|---|---|
| 5,265,252 A * | 11/1993 | Rawson et al. | 719/326 |
| 6,714,998 B2 * | 3/2004 | Hara et al. | 710/10 |
| 6,795,846 B1 * | 9/2004 | Merriam | 709/203 |
| 6,885,472 B1 * | 4/2005 | Konno et al. | 358/1.15 |
| 7,082,524 B2 * | 7/2006 | Shah | 713/1 |
| 2003/0103226 A1 * | 6/2003 | Nishio | 358/1.13 |

OTHER PUBLICATIONS

Zhang et al., Automatic generation of device drivers, vol. 38, Issue 6 (Jun. 2003), pp. 60-69, Year of Publication: 2003.*
Lim et al., Priority queue-based IEEE1394 device driver supporting real-time characteristics, Consumer Electronics, IEEE Transactions on, vol. 46, Issue 3, Aug. 2000 pp. 825-833.*

* cited by examiner

*Primary Examiner*—Meng-Ai An
*Assistant Examiner*—Lechi Truong
(74) *Attorney, Agent, or Firm*—Shook, Hardy & Bacon LLP

(57) ABSTRACT

A method and system are provided for facilitating communication between a computing device and a network scanner upon discovery of the network scanner. The system includes a driver having an operating system communication layer and a scanning profile communication layer, the scanning profile communication layer implementing a zero configuration device network architecture. The driver includes a translation mechanism for translating information between a scanning communication protocol of the scanning profile communication layer and an operating system communication mode of the operating system communication layer. The driver may further include a scanning command module for transferring scanning commands from the driver to the network scanning device and a data handler for opening a communication channel between the driver and the scanner and transmitting scan data over the communication channel.

37 Claims, 8 Drawing Sheets

SYSTEM AND METHOD FOR FACILITATING INTERACTION BETWEEN A COMPUTER AND A NETWORK SCANNER

CROSS-REFERENCE TO RELATED APPLICATION

Not applicable.

STATEMENT REGARDING FEDERALLY SPONSORED RESEARCH OR DEVELOPMENT

Not applicable.

1. Field of the Invention

This invention relates to the field of network communications and more particularly to communications between a network-enabled imaging device such as a scanner and a computing device.

2. Background of the Invention

Networked imaging devices are likely to become more prevalent over the coming years with the increase of home and small office computer networks and the decrease in the cost of including network interfaces in imaging devices. One of the advantages of these networks is the ability to have multiple computing stations while minimizing the capital expended on peripheral devices. These peripheral devices often include printers, scanners, and/or facsimile machines. The manufacturers of these devices are recognizing increasing benefits to operation in a network and are therefore moving away from other hard connectors and bus protocols. Additionally, the technology continues to move toward operation in a wireless environment. In this wireless environment, peripherals communicate with a host computer without a hard or cable connection. In this wireless communication model, the bottom level of connectivity will be networked. Therefore, there exists a need to support and manage peripheral devices in a networked environment.

Currently, available network scanners require a specific driver in order to communicate over the network. The drivers are generally specific to the manufacturer and model of the scanner and are typically not interchangeable. Accordingly, a specific driver must be installed on each computing device in the network in order to enable the computing devices to interact with the network scanner. This process creates a burden for both users and administrators of the network. Furthermore, the process of creating a driver for each scanner model is burdensome to the scanner manufacturer. If manufacturers did not have to address the issue of communication with personal computing devices, they would be better able to focus their attention on innovations to their devices and value added software, while leaving implementation of computer communications to techniques of the invention.

Existing computer architectures do not all support networked imaging devices. The latest version of the Microsoft Windows Image Acquisition (WIA) system, a product of the Microsoft Corporation of Redmond, Wash., includes enhancements to support networked imaging devices. Accordingly, network scanners, digital still cameras, and other networked imaging devices may operate in conjunction with WIA.

As set forth above, in most peripheral devices, the communication protocol is manufacturer specific. Universal Plug and Play (UPnP) is a networking architecture that provides compatibility among networking equipment manufactured by many vendors that are part of the UPnP Forum. UPnP can be supported on any operating system and boasts device-driver independence. Accordingly, UPnP can be used to unify peripheral device languages. UPnP additionally has the advantages of having a mechanism for querying about properties and allowing for vendor-specific device extensions.

It can therefore be seen that a need exists for a computer system and method that will support network-connected peripheral imaging devices. There is, therefore, a need to generalize the device-specific solutions that exist in the world today. It would be beneficial if all device manufacturers, such as imaging device manufacturers, were able to install a driver that is needed to communicate with their device, and that after such an installation, the device appears and functions as if locally connected to the computer.

This need should be addressed on a global basis without the resources required for device-specific solutions. A driver is needed that will operate within both a zero configuration device network architecture, such as the UPnP architecture, and a prevalent operating system architecture such as WIA. Such a driver would bridge a peripheral device profile with the operating system architecture. Therefore, a driver is needed that is capable of translating to allow a computer operating system to communicate with peripheral imaging devices such as network scanning devices. Consequently, if a large number of scanning devices connected with the same network can use the same driver, these scanning devices will be supported with minimal effort from users, administrators and manufacturers.

SUMMARY OF THE INVENTION

In one aspect, the present invention is directed to a method for facilitating communication between a computing device and a network scanner upon discovery of the network scanner. The method includes sending a scanning request to a driver on the computing device, the driver having an operating system communication layer and a scanning profile communication layer, the scanning profile communication layer implementing a zero configuration device network architecture. The method additionally includes implementing a translation mechanism through the driver for translating between the operating system layer and the scanning profile layer.

In an additional aspect, the invention comprises a system for facilitating communication between a computing device and a network scanner upon discovery of the network scanner. The system includes a driver having an operating system communication layer and a scanning profile communication layer, the scanning profile communication layer implementing a zero configuration device network architecture. The system additionally includes a translation mechanism within the driver for translating information between a scanning communication protocol of the scanning profile communication layer and an operating system communication mode of the operating system communication layer.

In a further aspect, a method is provided for controlling a scanner connected over a network with at least one computing device after discovery of the scanner on the network and loading of a driver on the computing device. The method includes receiving a scan request at the driver and translating the scan request from an operating system communication mode to a scanning communication protocol, wherein the scanning communication protocol implements a zero configuration device network architecture. The method additionally includes instructing the scanner to begin a scan from the driver and receiving notification of a scanned document at the driver.

In yet an additional aspect, the invention includes a method for controlling a scanner connected over a network with at least one computing device after discovery of the scanner on the network and loading of a driver on the computing device. The method includes receiving a scan request at the driver and transmitting the scan request from the driver to the scanner. The method additionally includes receiving scanning information from the scanner, translating the scan information from the scanning communication protocol to an operating system communication mode, and passing the translated information up through the operating system.

In a further aspect of the invention, a driver is installed on a computing system for facilitating communications between the computing system and a network scanning device. The driver includes a scanning command module for transferring scanning commands from the driver to the network scanning device and a translation mechanism for translating information between a scanning communication protocol and an operating system communication mode. The driver additionally includes a data handler for opening a communication channel between the driver and the scanner and transmitting scan data over the communication channel.

BRIEF DESCRIPTION OF THE DRAWINGS

The present invention is described in detail below with reference to the attached drawing figures, wherein.

DETAILED DESCRIPTION OF THE INVENTION

Figure 1:
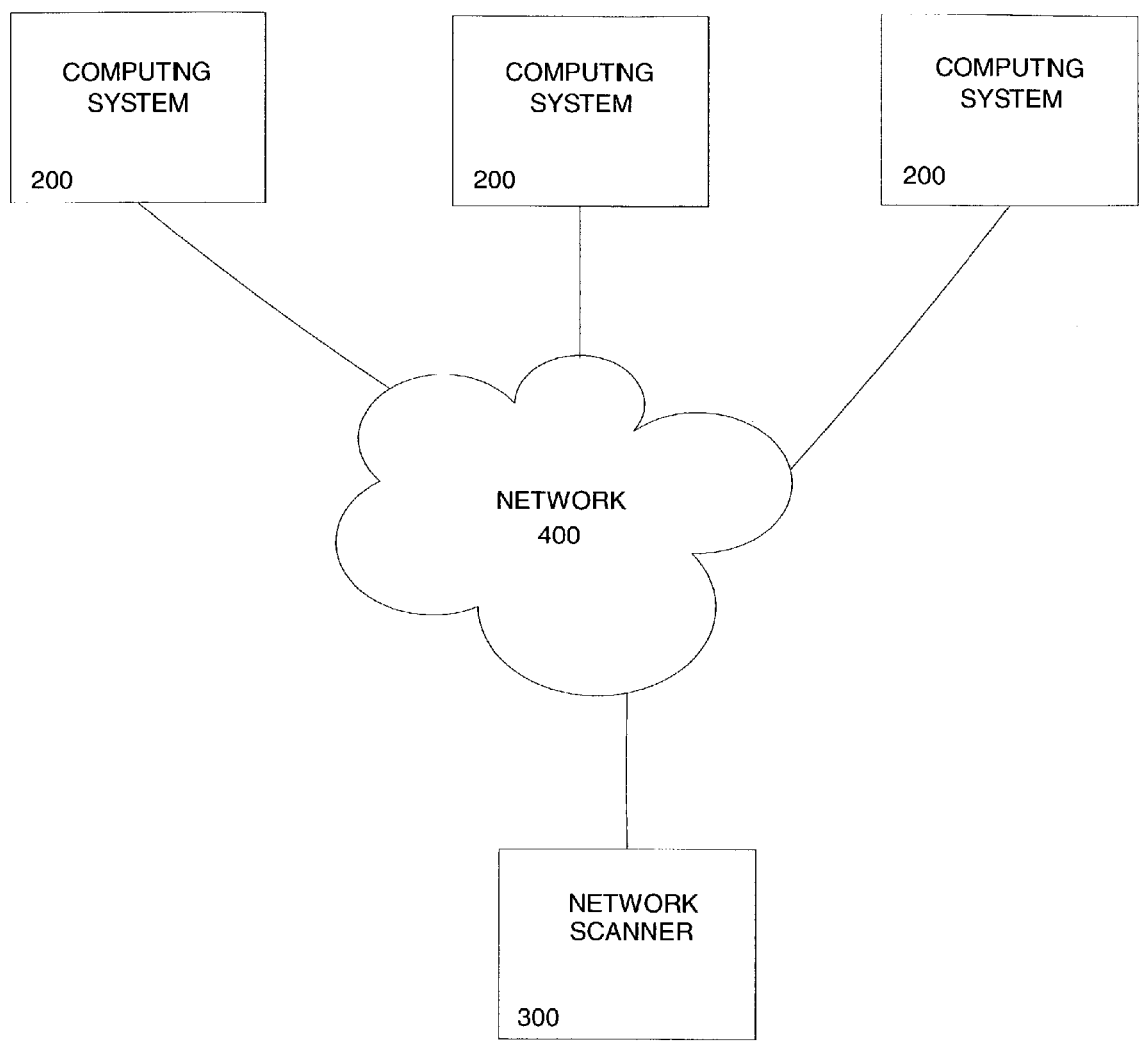
FIG. 1 is a block diagram showing components of a first embodiment of a system of the invention.

FIG. 1 illustrates a plurality of computing systems 200 capable of communicating with one or more network-enabled scanners 300 over a network 400. Exemplary computing systems 200 are described below with reference to FIG. 2.

Figure 2:
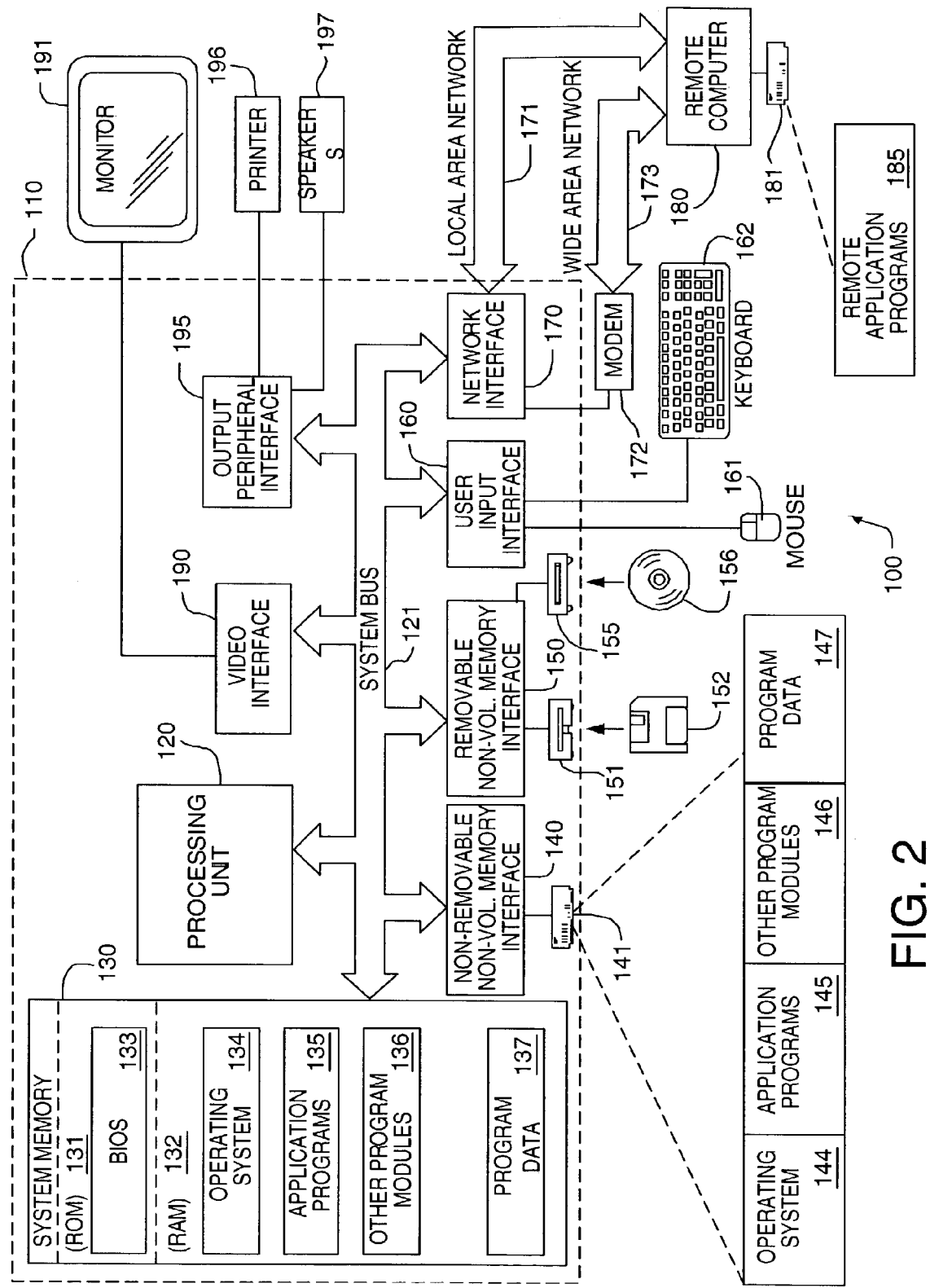
FIG. 2 is a block diagram of a suitable computing system environment for use in implementing the present invention.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Figure 3:
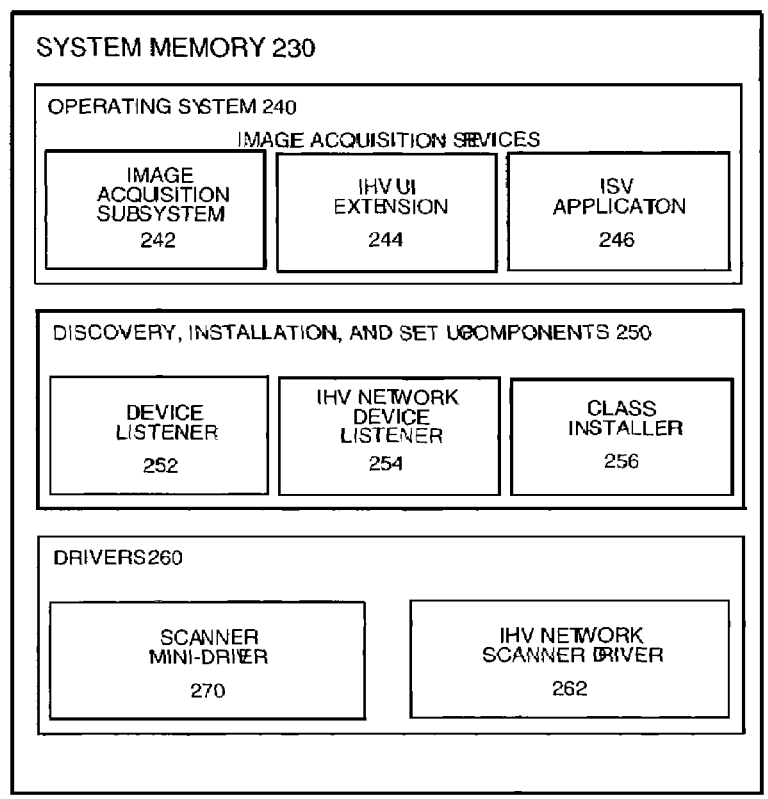
FIG. 3 is a block diagram illustrating a components of a system memory in accordance with an embodiment of the invention.

FIG. 3 illustrates a system memory 230 of the computing system 200 in an embodiment of the invention. The system memory 230 may include the displayed components as well as additional components. Operating system image acquisition services 240 include image acquisition tools 242, independent hardware vendor (IHV) user interface (UI) extensions 244, and independent software vendor (ISV) applications 246. The system memory 230 may further include discovery, installation, and setup components 250. The discovery, installation, and setup components 250 may include a device listener 252, an IHV network device listener 254, and a class installer 256. The system memory 230 may additionally include drivers 260 including a UPnP scanner class mini-driver 270 and an IHV network scanner driver 262. The UPnP scanner class mini-driver 270 and the IHV network scanner driver 262 are implemented separately from one another. Only one of the drivers is implemented in each case. Typically, if a scanner model does not implement the UPnP protocol, the IHV network scanner driver 262 is implemented. If a scanner model does invoke UPnP, the UPnP scanner class mini-driver 270 is implemented.

Although the mini-driver 270 is described above as a UPnP driver, the mini-driver 270 may be configured to accommodate other zero configuration device network architectures. Architectures such as Home Audio Video interoperability (HAVi) and Jini may also be supported.

Discovery, installation, and setup components 250 support a method of announcing devices present on a computer network. This method may be proprietary (for example in the case of some HP devices) or may be an industry standard (in the case of Universal Plug and Play devices). The discovery, installation, and setup components 250 will enable an application, service or perhaps a plug-in to announce to the operating system services 240 the arrival and departure of such network connected imaging devices. The listening components 252 and 254 recognize the presence of new devices 300 on the network 400. This process is further described below in relation to FIG. 5.

The class installer 256 launches upon discovery of a networked imaging device. Once the scanner 300 is detected on the network, the class installer 256 may install the mini-driver 270 and initialize it to establish communication for control, data transfer and the receiving of events from the scanning device 300. Optionally the class installer 256 can be invoked in a manual manner if the network imaging device 300 does not support auto-discovery techniques. In this case, the user will invoke a user interface that enables the user to select the device model to install as well as configure its addressing information.

Figure 4:
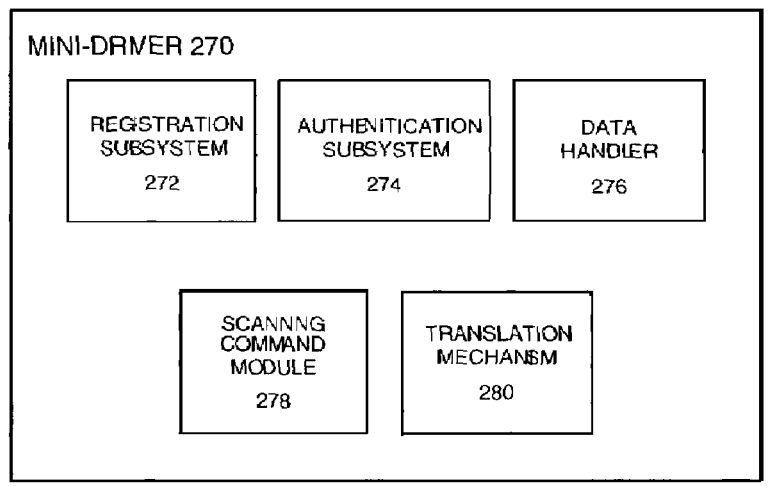
FIG. 4 is a block diagram illustrating components of a driver in accordance with an embodiment of the invention.

FIG. 4. further illustrates components of the scanner mini-driver 270. The components may include registration subsystem 272, authentication subsystem 274, data handler 276, scanning command module 278, and translation mechanism 280. As discussed below in connection with FIG. 5, the scanner 300 is discovered by the computing system 200 via the standard UPnP discovery protocol. After discovery, the computing system 200 loads the aforementioned mini-driver 270. The mini-driver 270 upon loading uses the scanner's device address received during the discovery phase 300 and it understands the language that the scanner 300 speaks. The mini-driver 270 uses its registration tools 272 to send a registration command to the scanner 300. The scanner 300 receives and stores any name or information sent by the computing system 200. The mini-driver 270 uses its authentication subsystem 274 to authenticate the computing system 200 or the user acting on behalf of the computing system 200. The authentication subsystem 274 may verify a pin number, a password, or other identifying feature that the user provides to the scanner 300. The scanning command module 278 provides a scan command to the scanner 200.

The translation mechanism 280 is capable of detecting vendor-specific device extensions of the scanner or peripheral device manufacturer and automatically converts these vendor-specific device extensions into operating system acquisition service properties, commands, or events. This translation mechanism 280 enables a vendor-specific application to specifically use the vendor-specific extensions. This ability enables the scanner vendor to define nonstandard extensions without requiring any additional driver software on the computing system 200.

The communication protocol of the scanner 300 has properties allowing the device 300 to define itself. The scanner 300 is able to identify itself as a scanner and also identifies its features such as automatic document feed, size etc. In the UPnP protocol, the vendors can extend properties through custom definition. The translation mechanism 280 exposes the vendor's extensions and translates them so that the operating system services 240 can understand the properties. Each scanner property has attributes such as a type (string, integer, Boolean, etc) and a specified number of values. The translation mechanism 280 recognizes these attributes. The translation mechanism 280 can be viewed as having two layers including a bottom layer that understands the communication protocol of the scanner 300 and a top layer that knows how to speak the language of the operating system services 240.

Figure 5:
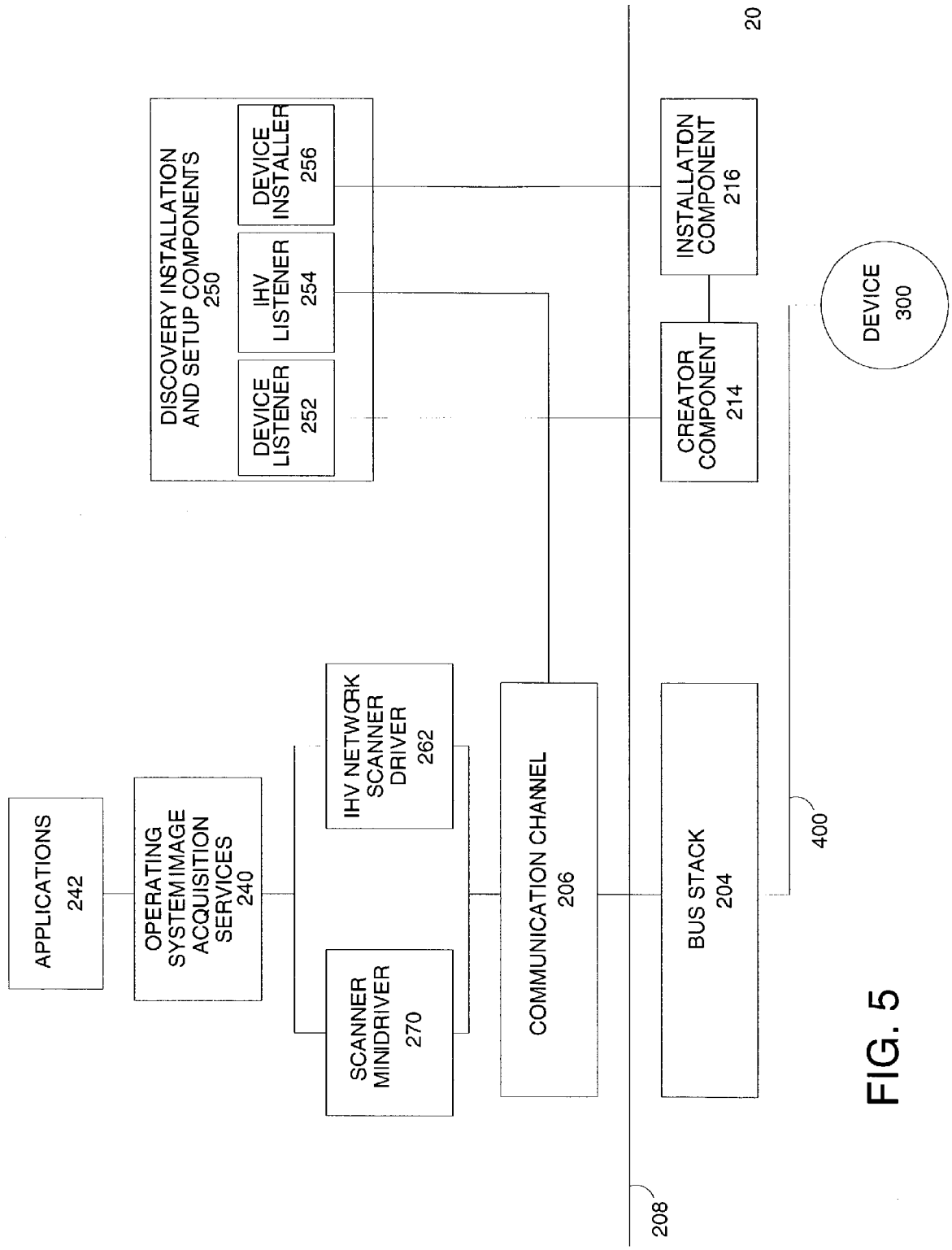
FIG. 5 is a block diagram illustrating interaction between components in an embodiment of the system of the invention.

FIG. 5 is a block diagram illustrating the interaction of the above-described components when the computing system 200 is connected with a networked peripheral device such as the scanning device 300. The device 300 is connected to a network 400. For example, the network 400 can be an Ethernet network and the device 300 would then have an Ethernet connection thereon. The network 400 communicates through a bus stack 204. In the Windows operating environment, bus stack 204 can be a kernel bus stack equipped to communicate with the network 400. This network stack 204 can be used even for devices connected on a local bus. In this environment, all devices, even local devices, communicate over the network. To accomplish this, a conversion or mapping layer is provided in the stack 204 that allows a network stack to be placed on a locally connected stack. The bus, either network or local, is thus abstracted from the top-most layers. This allows a single stack to be used that supports all devices. The use of a single stack results in a more stable system and lower maintenance costs.

The stack 204 communicates with a communication channel 206. Continuing with the Windows Operating System example, the communication conduit 206 is typically known as Winsock. As a matter of general background, the bus stack 204 operates in the kernel mode and the communication conduit 206 operates in the user mode. The line 208 in FIG. 5 notes this differentiation of modes. The kernel manages memory, files, and peripheral devices. The kernel also functions to maintain the time and date, launches applications, and typically allocates system resources. Typically, changes or additions in the kernel are more difficult to develop and implement than changes in other portions of the system.

Discovery, Installation, and setup components 250 include a plurality of listening components including a device listener 252, and IHV listener 254, and a class installer 256. The listening modules 252 and 254 listen for specific device announcements on the network. For example, the device listening module 252 could be a module that listens for PnP or UPnP devices. The IHV listening module 254 could be a module that listens for proprietary devices. For example, the listening module could listen for Hewlett Packard scanners or other devices. The listening modules 254 may be in communication with the network 400 and wait for announcements for connected devices on the network.

The discovery, installation, and setup components 250 receive announcements from the listening modules 252 and 254 and determine whether a newly detected device already is recognized. Each device has a unique ID by which it is recognized. If the device ID is already recognized, the components 250 will determine if any alterations, such as the IP address, regarding the device are needed. If the device is not recognized, the components 250 will ask for a logical representation of the device to be created. This function is carried out by the creator component 214. In the Microsoft Windows environment, the logical representation of a device is called a device node. Thus, in the Microsoft Windows environment, the creator component 214 will create a device node for the discovered device.

Once a device node is created, the logical representation of the device 300 appears to the computing system 200, and the computing system 200 understands that the device 300 is connected. The device 300 is treated much the same as a device connected locally. The creation component 214 communicates with an installation component 216. Component 216 communicates with a device installer 256 in the user mode. The device installer 256 can be a Windows Imaging Acquisition (WIA) class installer or other facility that coordinates the installation of devices and drivers for the devices. Thus, the device installer 256 will install the mini-driver 270 for any newly attached and discovered network device.

Once the mini-driver 270 is installed, a message is broadcast to operating system image acquisition services 240. The services 240 include an application that loads communication specific libraries and that knows how to speak to a variety of devices. The services 240 also provide an interface for communication. The services 240 communicate the broadcast message to all applications running in the operating system. The message communicates that a new device has arrived and is connected. Upon receiving the message, services 240 will also find the appropriate driver associated with the newly announced and discovered device. The appropriate driver is loaded and knows how to speak to the associated device 300. The device 300 appears at this point to the computer to be the same as a physically connected, local device. As such, the device 300 can be controlled and managed to the same degree as a locally connected device. In effect, an operating system based application 242 will be able to interact with a networked based imaging device in the same manner as if the device was connected locally.

Figure 6:
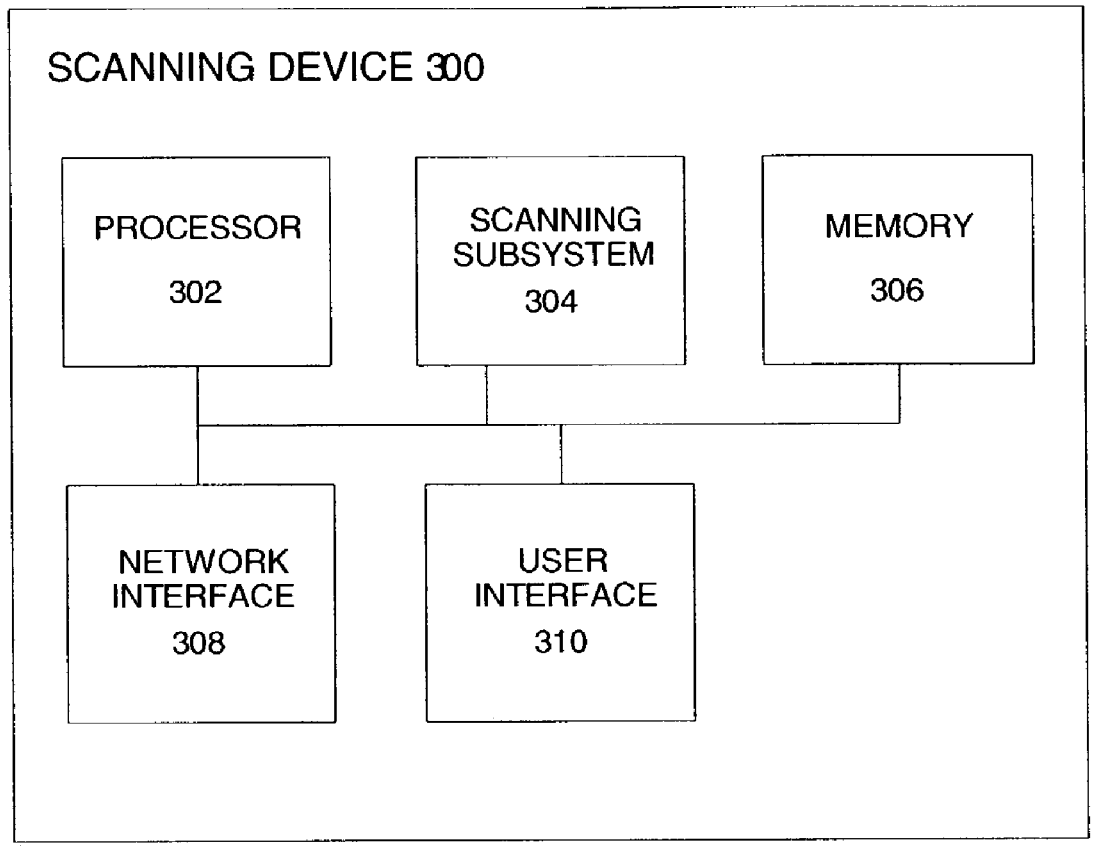
FIG. 6 is a block diagram showing components of a scanning device in accordance with an embodiment of the invention.

FIG. 6 is a block diagram illustrating components of the scanning device 300 in an embodiment of the invention. The scanning device 300 may include a processor 302, scanning tools 304, a memory 306, a network interface 308, and a user interface 310. The user interface may include an LCD or other type of display. When a user logs onto a computing system 200, the mini-driver 270 registers with the scanning device 300 such that the name of the computing system 200 appears on the LCD display of the scanning device 300.

At any time after recognition of a network device 300, the mini-driver 270 uses its registration subsystem 272 to send a register command to the scanning device 300. The scanning device 300 will typically receive and store computing system information from the mini-driver 270. The scanner 300 then adds the computing system 200 to its list of registered computing systems. Accordingly, a potential destination is registered on the scanning device 300. Since a number of users may use the computing system 200, the scanning device 300 may also have the capability to record specific user information as well as a computer name. Specific user information can include such devices as a pin number and password.

In use, the network scanning device 300 interacts with the mini-driver 270 to enable scanning operations. Broadly, the scanner 300 may receive a scan request through its user interface from an identified user. The user provides identification such as pin number, user name, or other identifier. The scanner 300 will send the request to the mini-driver 270 running on the destination computer. The mini-driver 270 uses its scanning command module 278 to send a command to the scanning device to initiate a scanning operation. The mini-driver 270 knows an IP address of the scanning device 300 as well as the communication protocol of the scanner 300. The scanner 300 knows a port address on the mini-driver 270 based on the user entry and sends scanned data. The mini-driver 270 receives the data and assembles it with data handler 276. The mini-driver 270 saves the scanned document and issues an event through the operating system services 240 to the applications 242 to indicate that there is a new document available.

Figure 7:
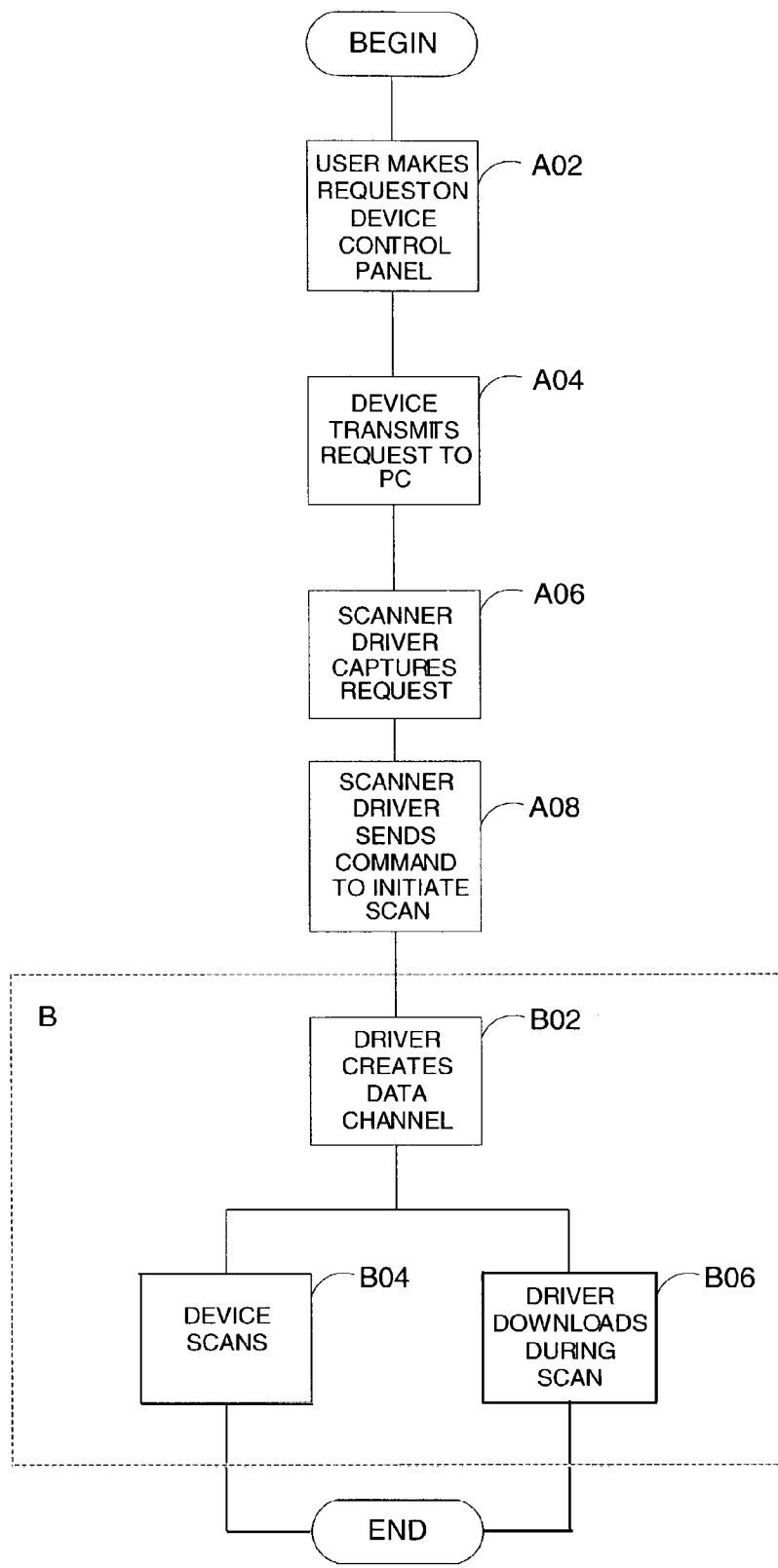
FIG. 7 is a flow chart illustrating a method of processing a device initiated request in accordance with an embodiment of the invention.
Figure 8:
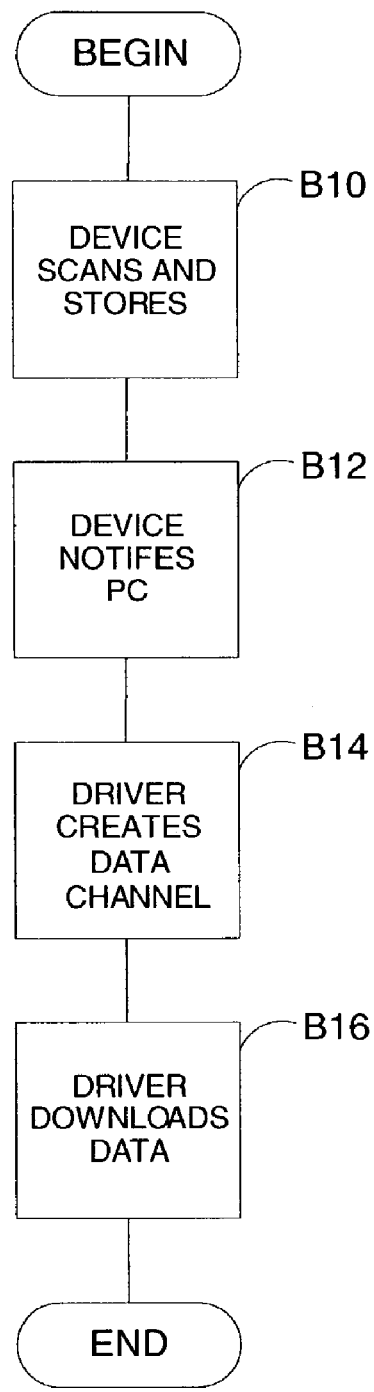
FIG. 8 is a flow chart illustrating a scanning and storage process in accordance with an embodiment of the invention.
Figure 9:
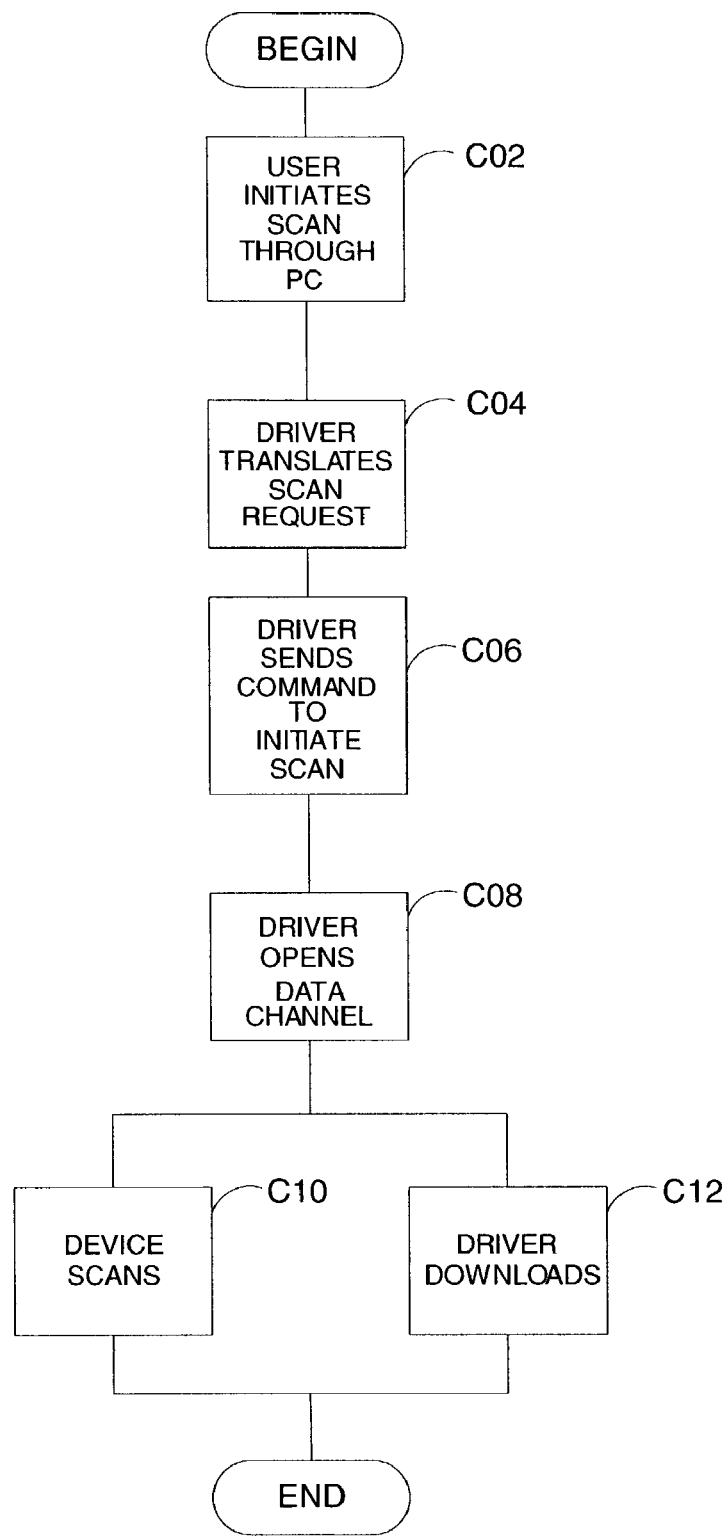
FIG. 9 is a flow chart illustrating a method for processing a computer initiated scanning request in accordance with an embodiment of the invention.

There are at least two scanning scenarios for network scanners: (1) a device initiated scan request in which the user interacts with the device's user interface to begin scanning one or more documents and (2) a computing system initiated scan request in which the user or application initiates a scan request via the computing system. FIGS. 7 and 8 illustrate steps involved in the first of the above-described types of scanning requests. FIG. 9 illustrates the steps involved in the second type of scanning request.

In the device-initiated scan involved in the first of the two scenarios, the network scanner 300 may operate in two modes dependent on the scanner's capabilities. In the case of a simple network scanning device, when the user initiates a scan via the scanner's control panel, the scanner 300 will simply send a request to the destination computing system 200 to initiate a scan.

FIG. 7 is a flow chart illustrating the steps involved in a device initiated scan in accordance with an embodiment of the invention. In step A02, a user makes a request through the user interface 310 such as a control panel on the scanning device 300. In step A02, the scanning device 300 transmits the request through the network interface 308 to the computing system 200. The scanner mini-driver 270 captures the request in step A06. In step A08 the scanner mini-driver 270 uses its scanning command module 278 to send a command to the scanner 300 to initiate the scan. In step B02, the scanner mini-driver 270 creates a data communication channel. In step B04, the device 300 uses its scanning subsystem 304 to perform a scan. During performance of the scan, in step B06, the scanner mini-driver 270 uses its data handling subsystem 276 to transfer the data from the scanner. In step B08, the scanner mini-driver 276 may use its translation mechanism 280 to translate information and transmit available information to an application 242.

FIG. 8 illustrates an alternative set of steps for obtaining data after requesting a scan at the scanning device 300. In the case of a more advanced network scanning device, the user will initiate a scan via the device's control panel and the device will begin scanning the document. The device stores the scanned document in its internal storage and will then notify the destination computing system 200 that there are scanned images waiting to be downloaded.

The steps shown in FIG. 8 would be performed on a scanner that has sufficient internal storage to store scanned images. For scanners with internal storage, in step B10, the scanning device 300 scans and stores the requested image. In step B12, the scanning device B12 notifies the computing system 200 that a scan has been stored. In step B14, the mini-driver 270 creates a data channel and in step B16, the mini-driver 270 transfers the scanned data.

In a computing system initiated scan, the user via a user interface or an application interacts through the operating system image acquisition services 240 to instruct initiation of a scan. In this case, the scanner mini-driver 270 translates the operating system specific scan request to the scanning communication protocol specific scan request.

FIG. 9 illustrates the steps performed during a scan initiated at the computing system 200. In step C02, the user initiates a scan through the computing system 200. The mini-driver 270 translates the scan request from the language of the operating system to a scanning protocol compatible format in step C04. In step C06, the mini-driver C06 uses its scanning command module 278 to initiate the scan. In step C08, the mini-driver 270 opens a data communication channel. In step C10 the scanning device 300 uses its scanning tools 304 to perform a scan and simultaneously, in step C12, the mini-driver 270 uses its data handler 270 to download scanned data through the created channel. The mini-driver 270 can direct data to storage within the computing system 200. Storage may be in global or public folders when the scanner 300 is only capable of registering a computer name. If the scanning device 300 can accept a user name and password, then the mini-driver 270 can direct scan information to user-specific folders.

In both of the above cases, the communication protocol specific behavior between the mini-driver 270 and the scanning device 300 is completely abstracted from the operating system image acquisition services 240. The translation mechanism 280 of the mini-driver 270 effects the translation between the scanner communication protocol requests and operating system requests.

The present invention bridges the scanning communication protocol (such as UPnP) with operating system services, such as WIA, thereby enabling applications to interact with scanners in the same manner as the applications interact with locally connected devices. Accordingly a single driver that would facilitate communication between a network scanner and computing devices linked to the network would provide a significant advantage for network users and administrators. The driver could be provided along with operating system software in order to avoid the necessity for installing further drivers when additional network scanners are installed. Using one driver, a large number of scanner devices can be supported.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and subcombinations are of utility and may be employed without reference to other features and subcombinations. This is contemplated and with the scope of the claims.

We claim:

1. A method for facilitating communication between a computing device and a network scanner upon discovery of the network scanner, the method comprising:

detecting a scanning request in a communication protocol from the network scanner at a driver on the computing device, the driver having an operating system communication layer and a scanning profile communication layer, the scanning profile communication layer implementing a zero configuration device network architecture, determining whether the communication protocol is recognized by the scanning profile communication layer by evaluating an identifier of the network scanner conveyed in the scanning request;
when the communication protocol is not recognized, performing an installation process comprising:
(1) finding an appropriate translation mechanism for translating the communication protocol by searching a communication library using the identifier of the network scanner; and
(2) automatically loading the translation mechanism on the driver; and
otherwise, initiating the scanning request;
translating between the operating system communication layer and the scanning profile communication layer utilizing the translation mechanism.

2. The method of claim 1, further comprising registering the network scanner.

3. The method of claim 1, further comprising opening a communication channel between the driver and the network scanner and transmitting data through the communication channel.

4. The method of claim 1, further comprising sending a scan request from the driver to the network scanning device.

5. The method of claim 4, further comprising translating a scan request from an application before transmitting the scan request to the network scanner.

6. The method of claim 1, further comprising using a data handler within the driver to direct scan information to appropriate storage.

7. The method of claim 6, wherein directing scan information to appropriate storage comprises directing scan information to a user folder.

8. The method of claim 6, wherein directing scan information to appropriate storage comprises directing scan information to global computing system storage.

9. The method of claim 1, further comprising utilizing the driver to download scan information from the network scanner during a scanning operation.

10. The method of claim 1, further comprising processing a computer system-initiated scan request.

11. The method of claim 1, wherein the zero configuration device network architecture is one of UPnP, HAVi, and Jini.

12. A system embodied on one or more computer storage-media having computer-executable instructions provided thereon for performing a method for facilitating communication between a computing device and a network scanner upon discovery of the network scanner, the system comprising:
a driver having an operating system communication layer and a scanning profile communication layer implementing a zero configuration device network architecture;
a translation mechanism within the driver for translating information between a scanning communication protocol of the scanning profile communication layer and an operating system communication mode of the operating system communication layer, wherein an appropriate translation mechanism is installed to the driver from an operating system image acquisition service when the driver determines that the scanning communication protocol is not recognized, otherwise, implementing the translation mechanism, wherein determining comprises evaluating an identifier of the network scanner conveyed with the scanning communication protocol, and wherein installing comprises:
(1) finding the appropriate translation mechanism for translating the scanning communication protocol by searching a communication library using the identifier of the network scanner; and
(2) automatically downloading the translation mechanism on the driver, wherein the translation mechanism translates the information between the scanning communication protocol and the operating system communication mode; and
a registration subsystem for registering the computing system with the network scanner.

13. The system of claim 12, wherein the zero configuration device network architecture comprises one of UPnP, HAVi, and Jini.

14. The system of claim 12, further comprising a data handler within the driver for opening a communication channel between the driver and the network scanner.

15. The system of claim 12, further comprising registering an authorized user with the network scanner by using the registration subsystem.

16. The system of claim 12, further comprising a scanning command module for sending scanning commands from the driver to the network scanner.

17. A method for controlling a scanner connected over a network with at least one computing device after discovery of the scanner on the network, the method comprising:
receiving a scan request in a communication protocol at the driver;
determining whether the communication protocol is recognized by the driver by evaluating an identifier of the scanner conveyed in the scan request;
when the communication protocol is not recognized, performing an installation process comprising:
(1) finding an appropriate scanner mini-driver for translating the communication protocol by searching a communication library using the identifier of the scanner; and
(2) automatically loading the scanner mini-driver on the driver;
otherwise, initiating the scan request;
translating the scan request via the scanner mini-driver from an operating system communication mode to a scanning communication protocol, utilizing the scanner mini-driver, implementing a zero configuration device network architecture, the zero configuration device network architecture comprising at least one of UPnP and HAVi;
instructing the scanner to begin a scan from the driver; and
receiving notification of a scanned document at the driver.

18. The method of claim 17, wherein the zero configuration device network architecture further comprises Jini.

19. The method of claim 17, further comprising registering the network scanner using the driver.

20. The method of claim 17, further comprising opening a communication channel between the driver and the network scanner and transmitting data through the communication channel.

21. The method of claim 17, further comprising using a data handler within the driver to direct scan information to appropriate storage.

22. The method of claim 21, wherein directing scan information to appropriate storage comprises directing scan information to a user folder.

23. The method of claim 21, wherein directing scan information to appropriate storage comprises directing scan information to global computing system storage.

24. The method of claim 17, further comprising utilizing the driver to download scan information from the network scanner during a scanning operation.

25. The method of claim 17, further comprising processing a computer system-initiated scan request.

26. A method for controlling a scanner connected over a network with at least one computing device after discovery of the scanner on the network, the method comprising:
receiving a scan request at a driver;
transmitting the scan request from the driver to the scanner;
authenticating, by the scanner, at least one of the at least one computing device and a user in order to authorize the scan request;
receiving scanning information in a scanning communication protocol from the scanner, the scanning information comprising a device identification;
determining whether the scanning communication protocol is recognized by the driver by evaluating the device identification;
when the communication protocol is not recognized, automatically communicating a message to an operating system image acquisition service, the operating system image acquisition service accessing a library application therein based on the device identification to find an appropriate scanner mini-driver based on message and downloading the scanner mini-driver to the driver;
otherwise, initiating the scan request;
translating the scan information from the scanning communication protocol to an operating system communication mode via the scanner mini-driver and passing the translated information up through the operating system.

27. The method of claim 26, further comprising registering the network scanner using the driver.

28. The method of claim 26, further comprising opening a communication channel between the driver and the network scanner and transmitting data through the communication channel.

29. The method of claim 26, further comprising using a data handler within the driver to direct scan information to appropriate storage.

30. The method of claim 29, wherein directing scan information to appropriate storage comprises directing scan information to a user folder.

31. The method of claim 30, wherein directing scan information to appropriate storage comprises directing scan information to global computing system storage.

32. The method of claim 26, further comprising utilizing the driver to download scan information from the network scanner during a scanning operation.

33. The method of claim 26, further comprising processing a device-initiated scan request.

34. The method of claim 26, further comprising processing a computer system-initiated scan request.

35. A driver installed on a computing system having a processor, when driver executed by the processor for facilitating communications between the computing system and a network scanning device, the driver comprising:
a scanning command module for transferring scanning commands from the driver to the network scanning device;
a translation mechanism for translating information between a scanning communication protocol and an operating system communication mode, wherein an appropriate translation mechanism is installed to the driver from an operating system image acquisition service when the driver determines that the scanning communication protocol is not recognized, otherwise, implementing the translation mechanism, wherein determining comprises evaluating an identifier of the network scanning device conveyed with the scanning communication protocol, and wherein installing comprises:
(1) finding the appropriate translation mechanism for translating the scanning communication protocol by searching a communication library using the identifier of the network scanning device; and
(2) automatically downloading the translation mechanism on the driver, wherein the translation mechanism translates the information between the scanning communication protocol and the operating system communication mode;
a data handler for opening a communication channel between the driver and the scanner and transmitting scan data over the communication channel; and
a registration subsystem for registering the computing device with the network scanning device.

36. The driver of claim 35, wherein a computer user is registered with the network scanning device by using the registration subsystem.

37. The driver of claim 35, further comprising a driver for performing a conversion process, the conversion process comprising:
detecting the scanning communication protocol provided from the scanner;
identifying the scanner based on the vendor-specific device extensions within the scanning communication protocol;
selecting the appropriate translation mechanism based on the identified scanner; and
converting the vendor-specific device extensions to commands in the operating system communication mode via the selected scanner.

* * * * *